Aug. 27, 1940.   H. T. FAUS   2,213,085
TEMPERATURE-COMPENSATED ELECTRICAL DEVICE
Filed May 21, 1936   2 Sheets-Sheet 1
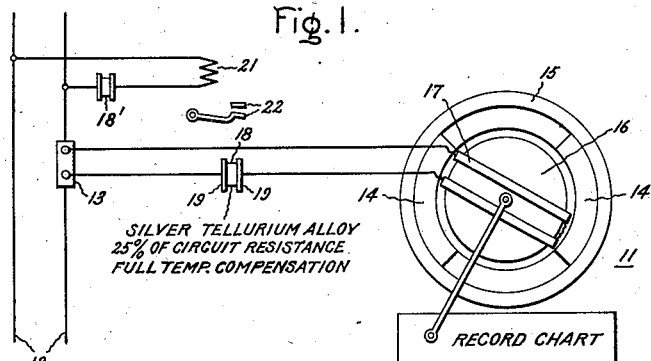
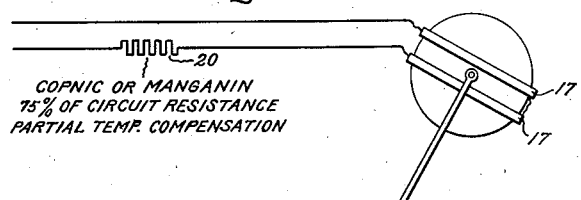
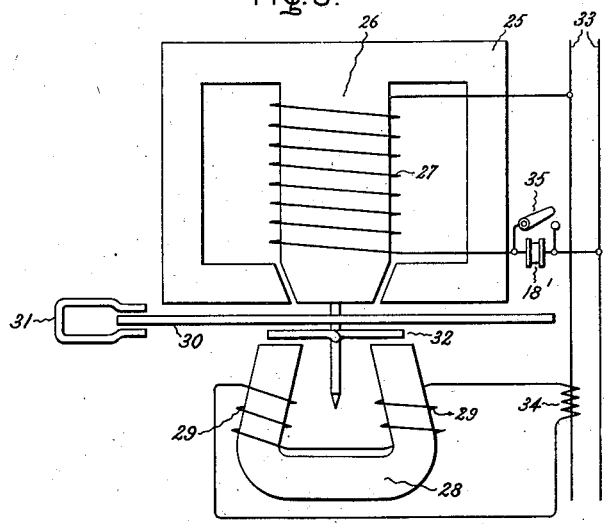
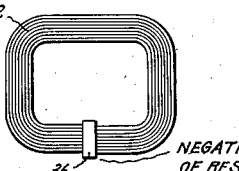
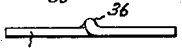
Inventor:
Harold T. Faus,
by Harry E. Dunham
His Attorney.

Inventor:
Harold T. Faus,
by Harry E. Dunham
His Attorney.

Patented Aug. 27, 1940

2,213,085

UNITED STATES PATENT OFFICE 2,213,085

TEMPERATURE-COMPENSATED ELECTRICAL DEVICE

Harold T. Faus, Lynn, Mass., assignor to General Electric Company, a corporation of New York Application May 21, 1936, Serial No. 80,975

3 Claims. (Cl. 171—264)

My invention relates to electrical current-conducting devices and concerns particularly arrangements for compensating such devices for variations in ambient temperature.

It is an object of my invention to provide indicating and recording instruments, meters, and other current-responsive devices with arrangements for compensation of effects of variation in temperature without objectionable affecting the sensitivity.

It is likewise an object of my invention to provide relays operating precisely at a predetermined voltage without regard to temperature variations.

Another object of my invention is to compensate electric motors for a tendency to vary in speed with variation in temperature.

Furthermore, in the case of induction type instruments for indicating or integrating watts and reactive component of voltamperes, it is an object of my invention to compensate such temperature errors as are dependent upon power factor. A more specific object of my invention is to provide improved temperature-compensating lag coils for such instruments.

Still another object of my invention is to provide a highly sensitive resistance type thermometer.

Other and further objects and advantages will become apparent as the description proceeds.

In accordance with my invention in its preferred form, in compensating a current-conducting device for the rise in resistance which occurs therein with increasing temperature, I connect a compensating resistor in series with the device to be compensated and I utilize a compensating resistor having a substantially linear negative coefficient of resistance exceeding in numerical value the positive temperature coefficient of resistance of the device to be compensated. For current-responsive devices, the compensating resistor is preferably one having a temperature coefficient at least substantially three times that of the device compensated so that only a fraction of the total resistance loss occurs in the compensating resistor and the sensitivity of the device is not greatly impaired by the addition of the temperature compensation.

The invention will be understood more readily from the following detailed description when considered in connection with the accompanying drawings and those features of the invention which are believed to be novel and patentable will be pointed out in the claims appended hereto.

Figure 6:
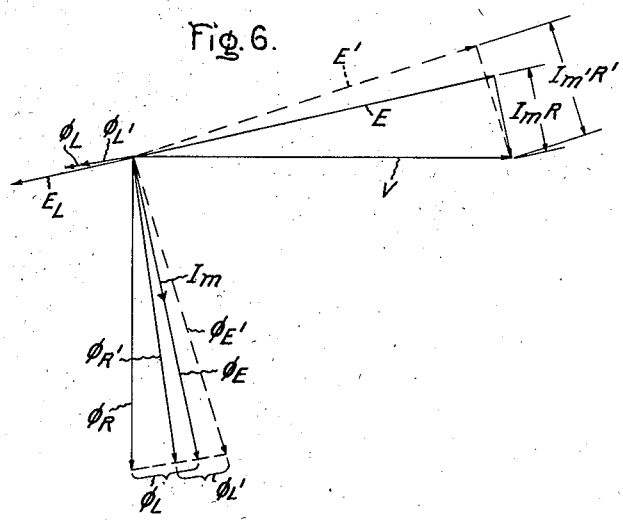
Figure 7:
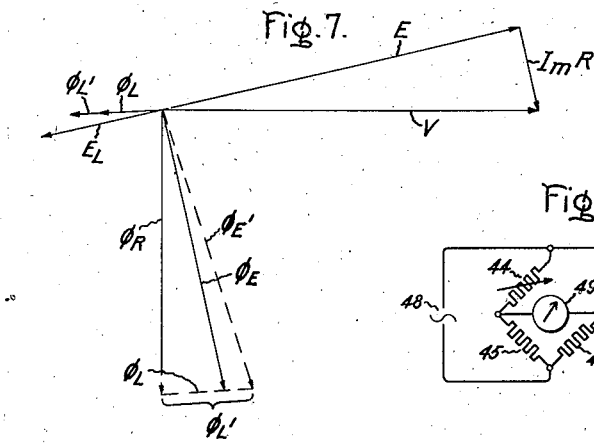
Figure 8:
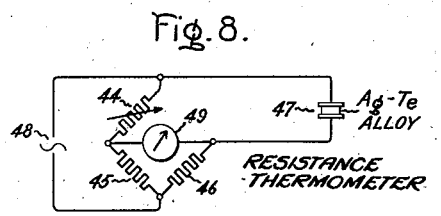
Figure 9:
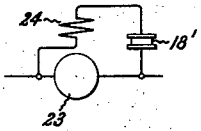
Figure 10:
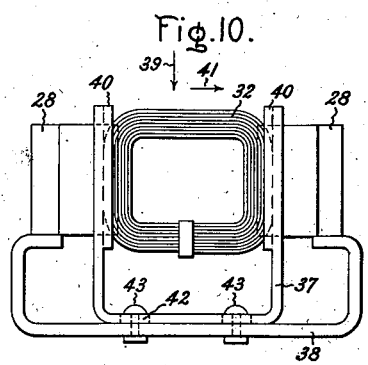

In the drawings, Fig. 1 is a circuit diagram schematically representing an embodiment of my invention as applied to measuring instruments or relays; Fig. 2 is a fragmentary circuit diagram of an instrument employing the conventional temperature compensation; Fig. 3 is a schematic and circuit diagram representing an embodiment of my invention applied to integrating induction type meters; Fig. 4 is a plan view of the lag coil embodied in the apparatus of Fig. 3; Fig. 5 is a side view of the lag coil; Figs. 6 and 7 are vector diagrams explaining the operation of the apparatus of Fig. 3 when uncompensated, and when compensated, respectively; Fig. 8 is a circuit diagram of another embodiment of my invention serving as a resistance thermometer; Fig. 9 is a circuit diagram of another embodiment of my invention applied to temperature compensation of motor speed; and Fig. 10 is a plan view of a mounting arrangement for the lag coil used in the apparatus of Fig. 3.

Like reference characters are utilized in the drawings to designate like parts throughout. In Fig. 1, there is shown a recording instrument 11 arranged to measure the current in an electric circuit 12. A shunt 13 carries the current to be measured and the instrument 11, which is really a millivoltmeter, is connected across the shunt 13 to deflect in accordance with the voltage drop in the shunt.

For the sake of compactness, the instrument 11 has a field structure of the type disclosed in my Patent No. 1,985,082 with radially-magnetized annular-segment permanent magnets 14, a keeper 15 of magnetical material surrounding the permanent magnets and a soft iron core 16, or the field structure may be of the type having an internal permanent magnet as disclosed in Patent No. 1,920,764, Nickle. Such leld constructions are not especially well adapted to temperature compensation by means of variable permeability elements shunting the air gap, and temperature compensation is ordinarily better accomplished by suitable means in the electrical circuit.

The movable element of the instrument 11 comprises a winding 17 carried on suitable pivots (not shown). Such windings are customarily composed of copper, which has a relatively high conductivity. The resistance of copper, however, as well as that of other known materials suitable for movable instrument windings, has a positive temperature coefficient of resistance, causing the calibration of the instrument to vary with temperature. In order to overcome the temperature error without greatly reducing the sensitivity of the instrument, I connect in series with the winding 17 a compensating resistor 18 having a negative temperature coefficient of resistance approximately equal in numerical value to three times the temperature coefficient of resistance of copper, and having a resistance at the average temperature of the instrument of approximately one-third the resistance of the winding 17.

One form of the high negative temperature coefficient compensating resistor 18 is composed of an alloy of fifteen per cent silver and eighty-five per cent tellurium. A method of making such resistors which I have found to be satisfactory is described as follows:

The alloy is made by adding silver or some other suitable element of the same family in the periodic table, to molten tellurium in a porcelain crucible, the silver dissolving rapidly when the tellurium is at a temperature barely above its melting point. This operation is carried out in an oxidizing atmosphere or in air while the mixture is being stirred to permit oxidation to take place freely.

The most convenient method of casting the alloy into resistors is to draw the molten alloy into glass tubes by means of a partial vacuum. After it has solidified in the tube, it may sometimes be pushed out in lengths of several inches without breaking. If it cannot be pushed out of the tube, it is placed in a solution of hydrofluoric acid which dissolves the glass without affecting the alloy. In order to stabilize the temperature-resistivity curve of the alloy, it is subjected to a simple annealing treatment.

After a heat treatment at from about 115 to 125° C. for about fifteen hours, an alloy is obtained which gives a substantially linear temperature resistance curve from minus 40° C. to plus 50° C. and shows no time lag in assuming the resistance corresponding to any temperature within this range. According to the annealing temperature employed, a negative temperature coefficient of resistance is obtained from about 1.2 to about 1.3 per cent per degree C.

I have found that the alloy may be made in the form of single crystal rods by passing the glass tubes containing the molten alloy from a furnace at a temperature of 480° C. into an oil bath at a temperature of 25 to 100° C. at a uniform rate of approximately ⅜" per minute. By this procedure solidification begins at one end and progresses at a uniform rate to the other end. The single crystal resistor has the advantages over poly-crystalline resistors of freedom from cracks, greater mechanical strength, and less likelihood of damage from electrolysis.

Good electrical connections may be made to this alloy by electroplating with nickle or cobalt and soldering to the plated surface. If desired, copper terminals 19 may be soldered to the plated alloy resistor 18.

As the temperature coefficient of resistance of copper is approximately .4 per cent per degree C. and my compensating resistor has a temperature coefficient of resistance of over 1.2 per cent per degree C., but negative, it is apparent that the numerical value of the temperature coefficient of resistance of my compensating resistor is at least three times that of copper. Consequently, a compensating resistor having a resistance at average ambient temperature of only one-third the resistance of an instrument winding serves to provide complete temperature compensation of the instrument for resistance variations. The compensating resistor constitutes but twenty-five per cent of the circuit resistance of the instrument and reduces its sensitivity but twenty-five per cent.

On the other hand, if a substantially zero temperature coefficient of resistance series resistor is used for compensation in accordance with known practice, the sensitivity is reduced in the same ratio as the temperature error. For example, in order to make the overall temperature coefficient of resistance .1 intsead of .4, reducing the temperature error to a fourth, it is necessary to connect in series a zero temperature coefficient of resistance resistor 20 (Fig. 2) having three times the resistance of the winding. There is a loss of seventy-five per cent of the available voltage. Inasmuch as the voltage available from a current shunt is limited, it will be apparent that twenty-five per cent of the available voltage will be insufficient to produce the torque required in a recording instrument.

Obviously, the invention is not limtied to recording instruments but includes current-conducting devices of various types subject to temperature error. For example, a relay 21, connected across the source 12, may be caused to operate its contacts 22 accurately at the same voltage regardless of temperature conditions by connecting in series with the relay a negative temperature coefficient of resistance resistor 18' having such resistance as to compensate for variations in impedance of the winding of the relay 21.

Under certain circumstances a negative temperature coefficient of as much as 1.3 per cent per degree C. may not be desired. For such circumstances, I may reduce the temperature coefficient in one or more of several ways. I may reduce the annealing temperature or the annealing time or I may vary the percentage of silver above or below 15 per cent, which I find gives substantially the maximum coefficient. For example, to obtain a negative temperature coefficient of .7 per cent per degree C., I may anneal a 15 per cent silver, 85 per cent tellurium alloy at 105° for about 15 hours or at 115° for about 4¼ hours. To obtain a negative temperature coefficient of .1 per cent per degree C., I may resort to little or no annealing.

As illustrated in Fig. 9, the tendency of a shunt-wound motor 23 or of a separately excited motor to vary in speed owing to variations in field current with temperature variations in field resistance or impedance may be overcome by connecting a negative temperature coefficient of resistance resistor 18' in series with the field or exciting winding 24.

The invention is likewise valuable in minimizing temperature errors in speed of motors of the type employed for integrating variable quantities, particularly power and reactive component of voltamperes of alternating-current circuits. An induction watt-hour meter embodying my invention is illustrated in Fig. 3. Such meters are subject to temperature errors of two kinds, Class I errors which come about through variations in the magnitude of the fluxes producing the driving and restraining torques and are substantially independeht of power factor, and Class II errors which come about through variations in the phase relationship between fluxes and are very materially affected by the power factor of the currents being measured.

Fig. 3 illustrates an arrangement for overcoming Class II errors. The watt-hour meter 25 comprises a potential core 26 carrying a potential winding 27, a current core 28 carrying a current winding 29, a rotatable disk 30, a drag magnet 31, and a lag coil 32. The potential winding 27 is connected across an electrical circuit 33 in which power consumption is to be measured, and the current winding 29 is connected in series with the circuit 33 or through a current transformer 34. Temperature compensating negative temperature coefficient of resistance resistors are connected either in series with the potential winding 27 or the lag coil 32, or in both locations.

In the drawings, a compensating resistor 18' is shown in series with the potential winding 27 and there is a switch 35 by means of which the resistor 18' may be shunted out. Another compensating resistor 36 is shown connected in series with the lag coil 32 (Fig. 4). If only one compensating resistor is employed, its size is made such as to overcome fully the Class II temperature error of the meter and not merely the resistance error of the circuit in which it is placed.

The use of the compensating resistor 18' in the potential circuit necessitates introducing some resistance into an otherwise almost wholly inductive circuit and, therefore, adds to the losses and to the amount of lagging required. For this reason, I ordinarily find it preferable to use only the compensating resistor 36 connected to the lag coil.

My invention is obviously not limited to the precise form shown in the drawings nor to particular dimensions. I have found, however, that satisfactory results are obtained in single-phase watt meters of standard make by employing a lag coil of the form illustrated in Fig. 4 constructed as follows:

A hollow-square shaped "pancake" type of winding is made up by winding 90 turns of .0025 of an inch by .045 of an inch enameled copper ribbon on a suitable ⅞ of an inch by 1¼ of an inch rectangular arbor, each layer of the winding constituting a single turn but the turns are connected in series, to give about 1.7 ohms resistance at 20° C. The inner and outer ends of the ribbon forming the winding are soldered or otherwise united to the ends of a 2.9-ohm heat-treated silver tellurium alloy rod prepared in the manner hereinbefore described. A rigid unitary lag coil is thus formed.

Preferably the lag coil 32 is movably mounted and it may be mounted to permit adjustment in either of two perpendicular directions in a plane parallel to the disk 30. For example, I may provide a sling 37 (Fig. 10) adjustably supported on a bracket 38 secured to the current magnet 28 or other supporting structure (not shown). The position of the lag coil 32 may be adjusted in a direction parallel to the arrow 39 by sliding in supporting grooves 40 of the sling 37. The position of the lag coil 32 may be adjusted in the direction of the arrow 41 by sliding the sling 37 along the bracket 38, the holes 42 cooperating with the rivets 43 being elongated. Although I have illustrated an arrangement having only horizontal adjustments of the lag coil, that is, adjustments parallel to the disk 30 (Figure 3), it will be understood that my invention is not limited to the precise arrangement shown.

The principle of the induction watt-hour meter is well known and need not be explained further than to say that potential and current fluxes, displaced in time phase, produced by the potential and current windings 27 and 29, respectively, react upon the induction disk 30 to cause rotation thereof. At unity power factor, the fluxes should be exactly in quadrature and, at other power factors, the potential flux should continue in quadrature with the voltage while the current flux remains in phase with the load current. At unity power factor, slight deviations in phase relationship of the fluxes from the correct condition are relatively unimportant. However, at lower power factors, when there is a substantial phase displacement between the voltage and load current in the circuit 33, deviation from the proper phase relationship of the fluxes will materially impair the accuracy of the meter. Such deviations tend to occur in an uncompensated meter owing to temperature variation as will presently be explained.

The flux produced by the current winding of a watt-hour meter is in phase with the load current of the circuit since the current winding carries the load current or a corresponding current. The magnetizing current of the potential winding and the flux produced thereby are nearly in quadrature with the voltage of the circuit, owing to the inductance of the potential winding, and a lag coil is customarily employed to bring about exact quadrature relationship at the average temperature of the meter.

In the vector diagram, Fig. 6, the vector V represents the voltage of the circuit 33, the vector $I_mR$ represents the resistance drop in the winding 27 due to the magnetizing current $I_m$, and the vector E represents the reactance drop corresponding to the voltage induced by the magnetizing current $I_m$. The vector $\phi_E$ represents the potential flux of the meter produced by the magnetizing current $I_m$ and is in quadrature with E. The line voltage V and the flux $\phi_E$ are not exactly in quadrature. However, the discrepancy may be corrected at any given temperature by means of a lag coil of conventional design. Such a lag coil acts as a transformer secondary inducing a voltage $E_L$. A conventional lag coil, consisting almost entirely of resistance, carries a current nearly in phase with the induced voltage $E_L$, which produces a flux $\phi_L$ nearly in phase with the voltage $E_L$. The flux $\phi_L$ combined vectorially with the flux $\phi_E$ produces a resultant flux $\phi_R$ in exact quadrature with the line voltage V. In case of a rise in temperature, the resistances of the winding 27 and of the lag coil also rise. Consequently, there is a greater resistance drop $I_m'R'$, causing a greater vectorial difference between the line voltage V and the induced voltage E'. As a result, the potential flux is advanced in phase as shown by the vector $\phi_E'$. At the same time, the flux produced by the lag coil is diminished in value with substantially no change in phase and a new value $\phi_L'$ results. The new resultant $\phi_R'$ is no longer in quadrature with the line voltage V.

Fig. 7 explains the compensation accomplished by means of my improved lag coil 32. As before, the flux $\phi_L$ produced by the lag coil 32 corrects the flux $\phi_E$ to produce a resultant flux $\phi_R$ in quadrature with V. Upon a rise in temperature, the flux $\phi_E'$ is again out of quadrature with the line voltage V. Owing to decrease in resistance of the lag coil with increase in temperature, the flux produced by the lag plate increases to the new value, $\phi_L'$. The resultant of $\phi_E'$ and $\phi_L'$ is, therefore, substantially the same as before and $\phi_R$ remains substantially independent of temperature.

In some watt-hour meters, the lag coil is employed also as a light-load plate operating as a shading coil to produce a torque overcoming static friction of the bearings supporting the disk 30. My lag coil lends itself well to such use also since it is a rigid unit and there are no leads to interfere with moving the coil 32 for adjustment, or to be broken during adjustment. The degree of lagging may be adjusted by moving the coil 32 in the direction of the arrow 39 (Fig. 10) i. e. radially of the meter disk, and the amount of light-load torque may be adjusted by moving the coil 32 in the direction of the arrow 41. My lag coil 32 may, of course, also be used in conjunction with a conventional lag plate or a conventional light-load plate or both to increase the ease and flexibility of adjusting the amount of lagging, the amount of light-load torque, and the amount of compensation of either or both for variations in temperature.

In carrying out my invention in connection with temperature measurement, a Wheatstone bridge may be employed as illustrated in Fig. 8 comprising resistance arms 44, 45, and 46, one or more of which is adjustable, for example, the arm 44, a resistance arm 47 composed of high negative temperature coefficient of resistance material, a source of current 48, and a galvanometer 49, which will, of course, be a suitable alternating-current instrument or detector if the source 48 is alternating. The resistance arm 47 may be composed of heat-treated silver tellurium alloy such as described. The use of alternating current has the advantage of guarding against any electrolysis of the resistor 47 in order to insure a high degree of constancy of its temperature-resistance curve. One of the other resistance arms, for example, the arm 46, may be of manganin or other suitable zero temperature coefficient of resistance material. Any effect of variations in ambient temperature on the resistances of the remaining two arms if made of like materials will be immaterial since their ratio will be unaffected. If desired, the arm 46 also may be of ordinary resistance material and its resistance variation may be allowed for in the calibrations. The arm 47 is placed at the point where the temperature is to be measured and the bridge is balanced by suitable adjustment of the variable resistance arm 44, which may be calibrated in degrees of temperature. If desired, the arms 47 and 46 may both be placed at the measured point. Owing to the high temperature coefficient of the silver tellurium alloy employed, a highly sensitive resistance thermometer is thus produced.

In cases where linearity of temperature change of resistance is not required much below 0° C., I may utilize substantially pure tellurium resistors for the applications described in this specification. Such resistors are not subject to damage by electrolytic effects regardless of the length of time direct current may be passed through them. Preferably tellurium resistors are processed in the same manner as the tellurium alloy resistor previously described, i. e., they are formed in single crystals by progressive solidification and subjected to the same annealing treatment.

I have discovered a relationship between thermal E. M. F. and temperature coefficient of certain classes of material. Materials having high negative temperature coefficient tend also to have a high thermal electromotive force. For example, I have found that an alloy containing equal atomic proportions of cadmium and antimony, known for its high thermal electromotive force, likewise has a high substantially linear negative temperature coefficient of resistance, exceeding 1.2 per cent per degree C., and is suitable for the applications described in this specification. Such an alloy may be prepared in rods cast in glass tubes explained in connection with the preparation of tellurium silver alloy. I have found also that cadmium antimony alloy is substantially free from electrolysis effects. The subject matter herein disclosed relating to materials having negative temperature coefficient of resistance is not claimed herein but is embraced in my copending divisional application, Serial No. 263,693, filed March 23, 1939.

I have herein shown and particularly described certain embodiments of my invention for the purpose of explaining its principle and showing its application but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States is:

1. A lag coil for an alternating-current watt-hour meter comprising in combination a winding with a positive temperature coefficient of resistance and in series therewith a compensating resistor with a negative temperature coefficient of resistance exceeding the coefficient of resistance of said winding.

2. An induction device having voltage and current electromagnets, a rotor of conducting material rotatably mounted between said electromagnets and acted upon by the fluxes of said electromagnets, and a lag coil between said electromagnets for modifying the phase relationship between the fluxes produced by the different electromagnets, said lag coil comprising a winding with a positive temperature coefficient of resistance and in series therewith a compensation resistor with a negative temperature coefficient of resistance exceeding the temperature coefficient of resistance of said winding.

3. In an induction device having a field structure carrying an exciting winding, a lag coil circuit in inductive relation with said field structure and having a negative temperature coefficient of resistance of sufficient magnitude to compensate for resistance temperature variations of said exciting winding and to maintain the flux produced by said exciting winding substantially in quadrature with the voltage applied thereto.

HAROLD T. FAUS.